(12) United States Patent
Snedecor

(10) Patent No.: US 6,390,274 B1
(45) Date of Patent: May 21, 2002

(54) SWITCHING APPARATUS FOR ARTICLE SORTING SWITCH

(75) Inventor: Mark Timothy Snedecor, Frisco, TX (US)

(73) Assignee: Sig Simonazzi North America, Inc., Plano, TX (US)

(*) Notice: Subject to any disclaimer, the term of this patent is extended or adjusted under 35 U.S.C. 154(b) by 0 days.

(21) Appl. No.: 09/867,224

(22) Filed: May 29, 2001

(51) Int. Cl.[7] .............................................. B65G 47/10
(52) U.S. Cl. ............................. 198/370.02; 198/370.03
(58) Field of Search ....................... 198/370.02, 370.03

(56) References Cited

U.S. PATENT DOCUMENTS

| | | | | |
|---|---|---|---|---|
| 4,732,259 A | * | 3/1988 | Yu et al. ............ | 198/370.02 X |
| 5,613,591 A | * | 3/1997 | Heit et al. ............ | 198/370.02 |
| 5,927,466 A | * | 7/1999 | Rowley ................. | 198/370.03 |
| 6,283,271 B1 | * | 9/2001 | Van den Goor ........ | 198/370.02 |

FOREIGN PATENT DOCUMENTS

| | | | | |
|---|---|---|---|---|
| EP | 507413 | * | 10/1992 | ............ 198/370.02 |
| GB | 1201592 | * | 8/1970 | ............ 198/370.02 |

* cited by examiner

Primary Examiner—James R. Bidwell
(74) Attorney, Agent, or Firm—Michael A. O'Neil

(57) ABSTRACT

A switching apparatus includes spaced, substantially parallel guide surfaces for receiving switch engaging members depending from pallets comprising an article sorting switch. A diverter block is positional in each of three switching orientations. The diverter block includes spaced, opposed, curved diverter surfaces which selectively direct the switch engaging members along three output paths depending upon the positioning of the diverter block.

2 Claims, 5 Drawing Sheets

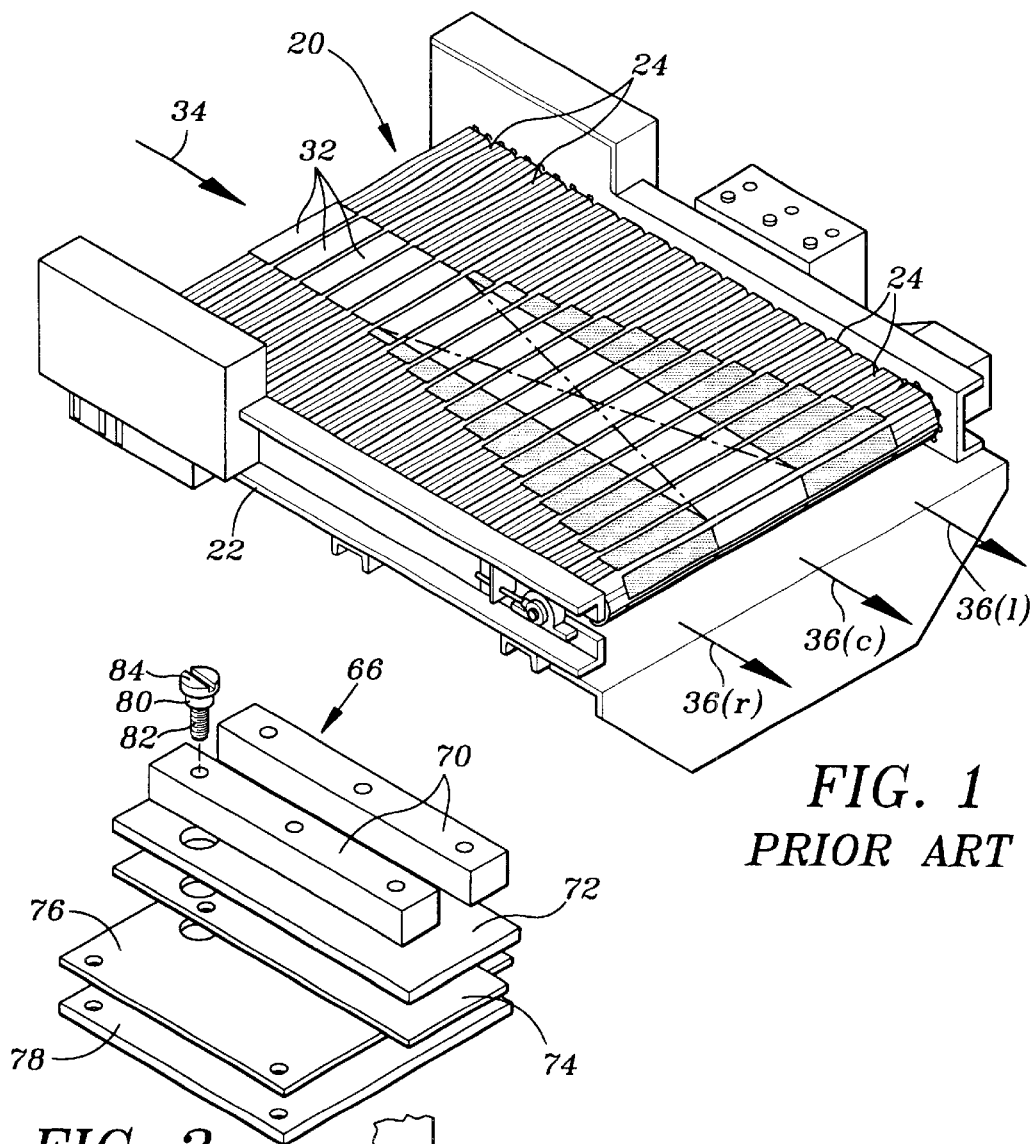
FIG. 1
PRIOR ART
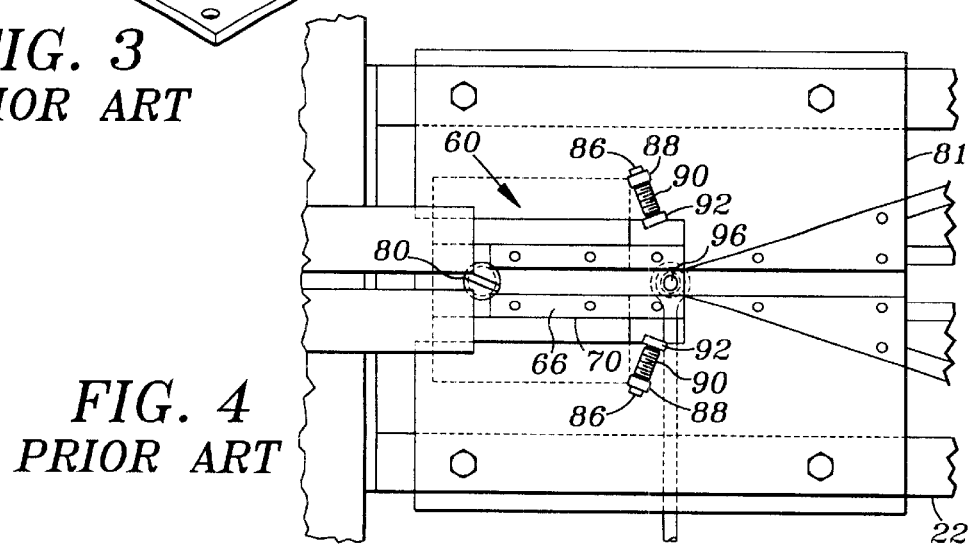
FIG. 3
PRIOR ART
FIG. 4
PRIOR ART

SWITCHING APPARATUS FOR ARTICLE SORTING SWITCH

TECHNICAL FIELD

This invention relates generally to article sorting switches of the type known as horizontal switches, and more particularly to an improved switching apparatus useful in horizontal switches and in similar applications.

BACKGROUND AND SUMMARY OF THE INVENTION

The present invention comprises an improvement over the switching apparatus disclosed in U.S. Pat. No. 4,946,022 ("the '022 Patent") granted to Davis, et al. on Aug. 7, 1990, and assigned to Stewart Systems, Inc., predecessor-in-interest of the assignee hereof, the disclosure of which is incorporated herein by reference. The '022 Patent discloses a switching apparatus incorporating a double acting cylinder which is utilized to pivotally locate a switching channel in any one of three selected switching orientations. The device disclosed in the '022 Patent has proven itself to be generally satisfactory in commercial utilization, however, the apparatus of the '022 Patent includes component parts which are relatively expensive to manufacture and difficult to assemble.

The foregoing difficulties relating to the switching apparatus disclosed in the '022 Patent were substantially overcome by the introduction of a switching apparatus comprising an elongate flexible track positioned in any of three switching orientations by a double action cylinder. The flexible track comprises a self lubricated nylon-based material and is less costly to manufacture and easier to assemble as compared with the apparatus of the '022 Patent. However, the flexible nylon track can occasionally break in service, leading to jamming of the switching apparatus and the horizontal switch in which the switching apparatus was utilized.

The present invention comprises an improved switching apparatus useful in conjunction with horizontal switches and in similar applications which overcomes the foregoing and other problems long since associated with the prior art. In accordance with the broader aspects of the invention, a switching apparatus includes a switching member which is slidably positionable in any one of three switching orientations. The apparatus of the present invention is advantageous over the above-described flexible track switching apparatus in that elimination of the flexing components results in increased reliability. The elimination of the flexing components also removes the force acting against movement thus allowing the diverting mechanism to move at a faster speed. This allows higher conveyor speeds to be achieved without changing the switching actuator.

Further advantages deriving from the use of the invention includes a shorter effective acting distance which allows the diverting action to occur in a larger window of time. The switching apparatus of the present invention includes a diverter block having curved diverting surfaces which allow gradual lateral acceleration of the components of the horizontal switch and articles carried thereby.

BRIEF DESCRIPTION OF THE DRAWINGS

A more complete understanding of the invention may be had by reference to the following Detailed Description when taken in conjunction with the accompany Drawings, wherein:

FIG. 1 is a perspective view illustrating a horizontal switch of the type disclosed and claimed in U.S. Pat. No. 4,946,022;

FIG. 3 is an exploded perspective view of the switching apparatus of the horizontal switch of FIG. 1;

FIG. 4 is an enlargement of a portion of FIG. 2;

DETAILED DESCRIPTION

Figure 2:
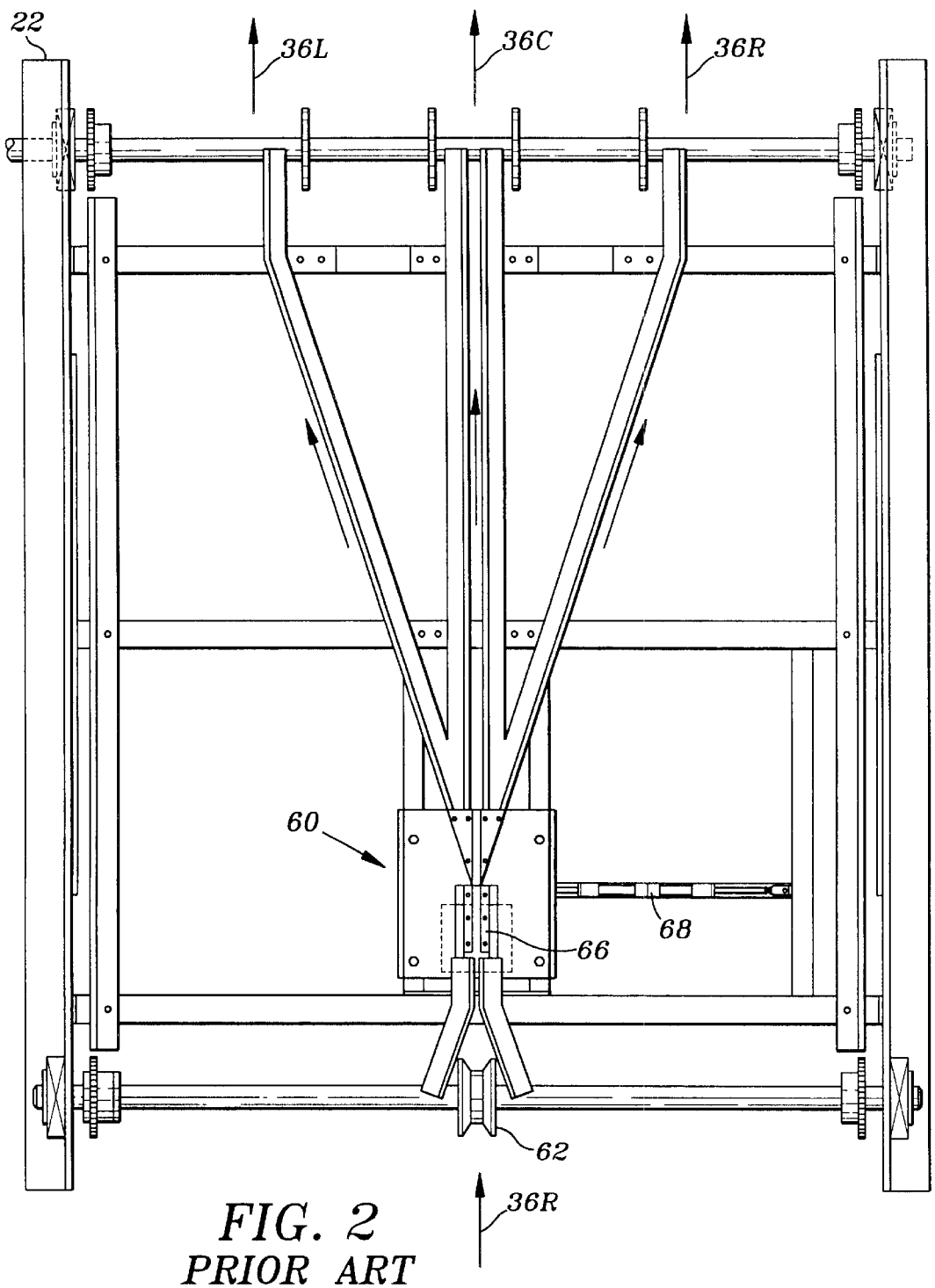
FIG. 2 is top view illustrating the switching apparatus of the horizontal switch of FIG. 1.

Referring now to the Drawings, and particularly to FIG. 1 thereof, there is shown a horizontal switch 20 of the type disclosed and claimed in U.S. Pat. No. 4,946,022, the disclosure of which is incorporated herein by reference as if fully set forth herein. The horizontal switch 20 includes a frame 22 which supports a plurality of pallet support members 24 for movement around a closed course including an upper horizontally disposed article sorting portion, a lower horizontally disposed pallet return portion, and curved end portions interconnecting the upper and lower portions. A plurality of pallets 32 are slidably supported on the pallet support members 24. In the operation of the horizontal switch 20, a sequence of articles is directed onto the pallets 32 along a single input path 34, and the pallets are actuated to selectively discharge individual articles along any one of the three output paths 36R, 36C and 36L. It will be understood, however, that horizontal switches of the type disclosed herein can be used to receive articles from a plurality of input paths and to direct the received articles to a plurality of output paths.

Referring to FIG. 2, each of the pallets 32 has a depending switch engaging member which is received by a guide wheel 62 and directed therefrom into a switching apparatus 60 including a switching channel 66. The switching channel 66 is selectively positioned by a double-acting cylinder 68 to direct the individual pallet either toward the output path 36R, or the output path 36C, or the output path 36L.

Referring to FIG. 3, the switching channel 66 includes diverter bars 70 which are supported on a diverter plate 72 by suitable fasteners. The diverter bars 70 define a switch engaging member receiving channel therebetween. A layer of low-friction material 74 is adhesively secured to the underside of the diverter plate 72. Another layer of low-friction material 76 is secured to a support plate 78. A diverter post 80 includes a lower threaded portion 82 which is received by the support plate 78 and an upper bearing portion 84 which is received in the diverter plate 72. Thus, it will be understood that the switching channel 66 defines a switch engaging member receiving channel which is supported for pivotal movement about an axis defined by the diverter posts 80.

The overall structure of the switching apparatus 60 of the sorting switch 20 is further illustrated in FIG. 4. The component parts of the switching apparatus are supported by base plate 81 which is in turn secured to the frame 22. The axis pivotal movement of the diverter plate 72 and the diverter bars 70 carried thereby as defined by the diverter post 80 is coincident with the entry end of the channel defined by the diverter bars. Therefore, the switching channels 66 are adapted to receive a switch engaging member depending from a pallet regardless of its pivotal positioning. The switching channel 66 is selectively pivoted by means of a rod 94 which is pivotally secured to the diverter plate 72 at 96. The rod 94 in turn extends to the double-acting cylinder 68. More particularly, the double-acting cylinder functions to cause the switching apparatus 60 to direct pallets towards the output path 36R, or the output path 36C, or the output path 36L depending upon whether none, one, or both of the cylinders of the double-acting cylinder mechanism 68 is actuated.

The limits of pivotal movement of the switching channel 66 are defined by a pair of stops 86. Each stop 86 includes a base 88 which is secured to the base plate 81, a threaded rod 90 which threadedly engages the base 88, and a diverter bar engaging stop 92 which is supported on the distal end of the threaded rod 90. The positioning of the stop, and therefore the limits of pivotal movement of the switching channel are determined by selectively rotating the threaded rod of a particular stop 86 relative to the base 88 thereof.

Figure 5:
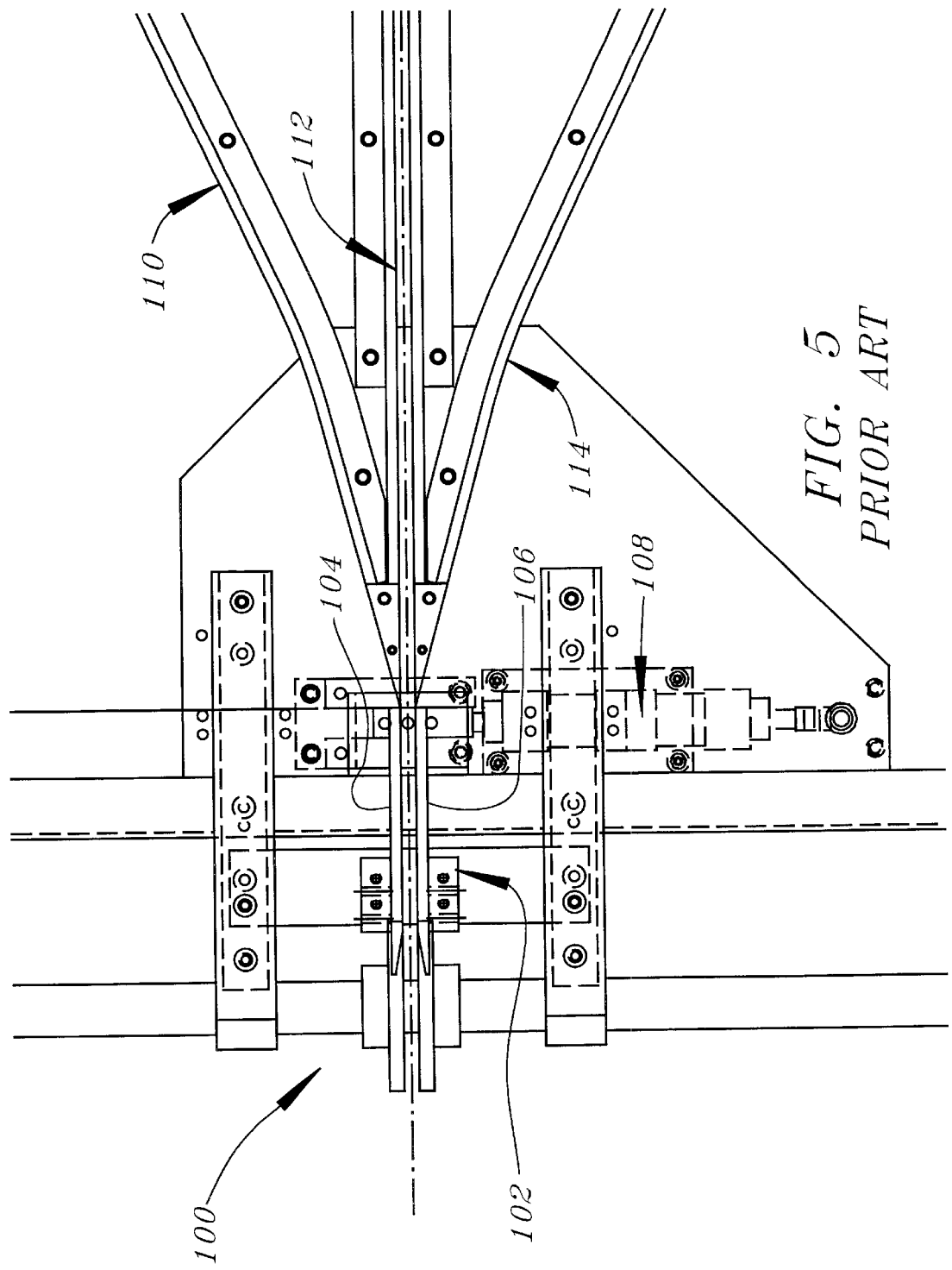
FIG. 5 is a top view of a flexible track switching apparatus.

Referring to FIG. 5, there is shown a flexible track switching apparatus 100. The apparatus 100 includes a diverter block 102 which supports and positions a pair of spaced, parallel, flexible diverters 104 and 106. The diverters 104 and 106 are selectively positional in any of three switching orientations by a double acting pneumatic cylinder 108.

The diverters 104 and 106 define a track which receives switch engaging members depending from the pallets comprising a horizontal switch. When the diverters 104 and 106 are positioned in a first switching orientation by the double acting pneumatic cylinder 108, the switch engaging members of the pallets are directed along a track 110. When the diverters 104 and 106 are positioned in a second orientation by the double acting pneumatic cylinder 108, the switch engaging members of the pallets are directed along a track 112. When the diverters 104 and 106 are positioned in a third switching orientation by the double acting pneumatic cylinder, the switch engaging members of the pallets are directed along a third track 114. As will be understood by those skilled in the art, the tracks 110, 112, and 114 are defined by guide members disposed in opposed triangular arrays.

Figure 6:
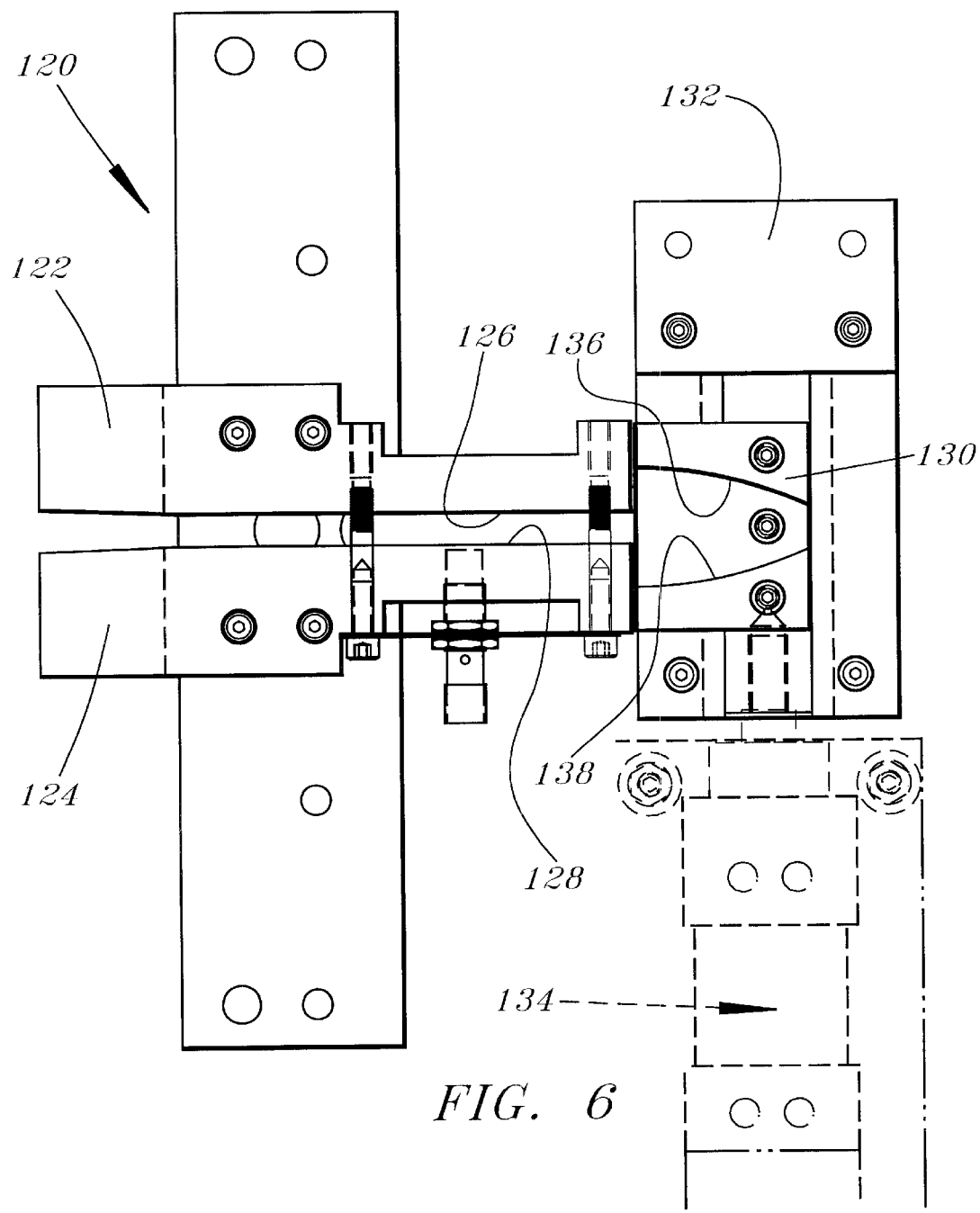
FIG. 6 is a top view of the switching apparatus of the present invention.

A switching apparatus 120 comprising the present invention is illustrated in FIG. 6. The apparatus 120 includes a pair of guide blocks 122 and 124 which define spaced, substantially parallel guide surfaces 126 and 128. A diverter block 130 is slidably supported on a subframe 132 for selective movement between each of three switching orientations under the action of an actuator 134 which may comprise a double acting pneumatic cylinder, a double acting hydraulic cylinder, a three position solenoid, or any other three position actuator, all of which are well known to those skilled in the art. The diverter block 130 comprises curved diverting surfaces 136 and 138.

Figure 7:
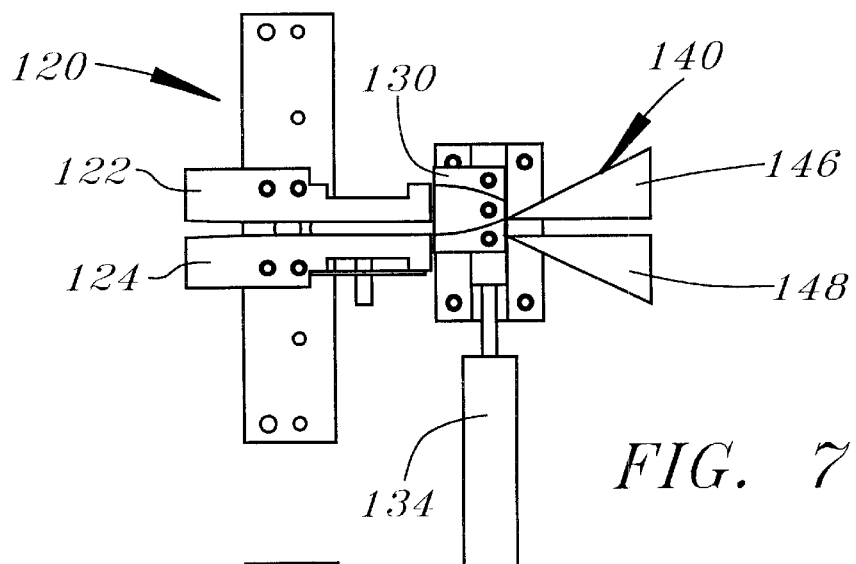
FIG. 7 is a view similar to FIG. 6 showing a switching apparatus of the present invention in a first orientation.
Figure 8:
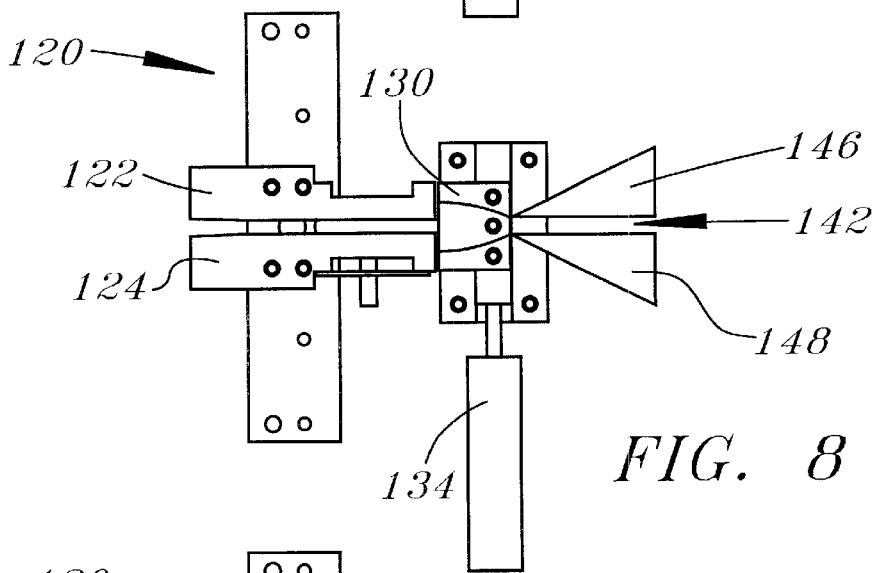
FIG. 8 is a view similar to FIG. 6 showing the switching apparatus of the present invention in a second orientation.
Figure 9:
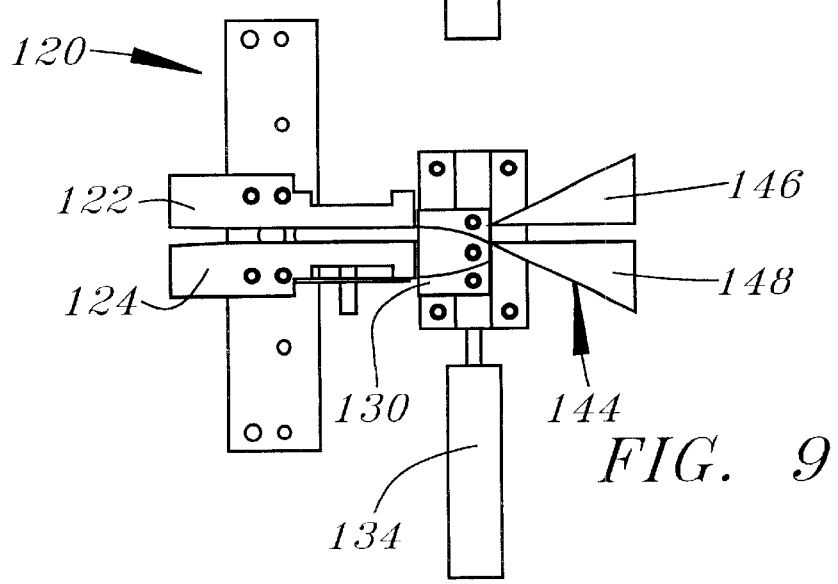
FIG. 9 is a view similar to FIG. 6 showing the switching apparatus of the present invention in a third orientation.

In the operation of the switching apparatus 120, switch engaging members depending from the pallets of a horizontal switch are received between the guide surfaces 126 and 128 and are directed thereby into the diverter block 130. Referring to FIG. 7, when a diverter block 130 is positioned in a first switching orientation by the actuator 134, the switch engaging members are directed along an output path 140. Referring to FIG. 8, when the diverter block 130 is positioned in a second switching orientation by the actuator 134, the switch engaging members are directed along path 142. Referring to FIG. 9, when the diverter block 130 is positioned in a third switching orientation by the actuator 134, the switch engaging members are directed along an output path 144. The paths 140, 142, and 144 are defined by triangular guide members 146 and 148.

Although preferred embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. A switching apparatus for an article sorting switch comprising:

a pair of guide blocks defining spaced, substantially parallel guide surfaces for receiving and directing switch engaging members depending from pallets comprising an article sorting switch;

a diverter block for receiving switch engaging members from the spaced, substantially parallel guide surfaces and selectively positionable in each of a plurality of switching orientations;

the diverter block comprising spaced apart, opposed, inwardly curved diverter surfaces for directing switch engaging members received in the diverter block from the spaced, substantially parallel guide surfaces along first or third output paths depending upon the positioning of the diverter block;

the inwardly curved diverter surfaces being spaced apart to define a second output path therebetween; and an actuator for slidably positioning the diverter block in first, second, and third switching orientations corresponding to the first, second, and third output paths.

2. A switching apparatus for an article sorting switch of the type comprising spaced, substantially parallel guide surfaces for receiving switch engaging members depending from pallets comprising an article sorting switch and a diverter for receiving the switch engaging members and for directing the switch engaging members along a plurality of output paths, the improvement comprising:

a diverter block supported for sliding movement between a plurality of switching orientations each individual to one of the output paths;

spaced, opposed, inwardly curved diverting surfaces on the diverter block for receiving switch engaging members from the guide surfaces and for directing the switch engaging members to either a first or a third output path depending upon the positioning of the diverter block;

the inwardly curved diverter surfaces being spaced apart to define a second output path therebetween; and an actuator for slidably positioning the diverter block in first, second, and third switching orientations corresponding to the first, second, and third output paths.

* * * * *